United States Patent
Shimokawa et al.

(10) Patent No.: US 9,634,493 B2
(45) Date of Patent: Apr. 25, 2017

(54) RESONANT FREQUENCY CONTROL METHOD, ELECTRIC POWER TRANSMITTING DEVICE, ELECTRIC POWER RECEIVING DEVICE IN MAGNETIC RESONANT TYPE POWER TRANSMISSION SYSTEM

(75) Inventors: Satoshi Shimokawa, Kawasaki (JP); Akiyoshi Uchida, Kawasaki (JP); Masakazu Taguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 999 days.

(21) Appl. No.: 13/562,974

(22) Filed: Jul. 31, 2012

(65) Prior Publication Data

US 2013/0015720 A1  Jan. 17, 2013

Related U.S. Application Data

(63) Continuation of application No. PCT/JP2010/000847, filed on Feb. 10, 2010.

(51) Int. Cl.
*H01F 27/42* (2006.01)
*H01F 37/00* (2006.01)
(Continued)

(52) U.S. Cl.
CPC .............. *H02J 5/005* (2013.01); *H01L 41/08* (2013.01); *H02M 7/48* (2013.01); *G06G 7/18* (2013.01)

(58) Field of Classification Search
CPC . H02J 5/005; H02J 7/025; H02J 17/00; H01F 38/14; H01F 38/00; B60L 11/182; G06G 7/18; H04B 5/00; H02M 7/48
(Continued)

(56) References Cited

U.S. PATENT DOCUMENTS 5,991,170 A    11/1999  Nagai et al.
6,144,139 A *  11/2000  Noma ................ H05B 41/2822
                                              310/316.01
(Continued)

FOREIGN PATENT DOCUMENTS

CA     2 374 291 A1    12/2000
CA     2 615 123       1/2007
(Continued)

OTHER PUBLICATIONS

Mexican Office Action issued for corresponding Mexican Application No. MX/A/2012/009085, dated Jul. 25, 2013 (with full translation).
(Continued)

*Primary Examiner* — Rexford Barnie
*Assistant Examiner* — Jagdeep Dhillon
(74) *Attorney, Agent, or Firm* — Greer Burns & Crain Ltd.

(57) ABSTRACT

In a resonant frequency control method in a magnetic field resonant coupling type power transmission system transmitting an electric power from a power transmitting coil to a power receiving coil using magnetic field resonance, a high-speed, accurate and real-time adjustment of the resonant frequency of a coil is realized. The phase of a voltage supplied to a power transmitting coil and the phase of a current that flows in the power transmitting coil or a power receiving coil is detected and the resonant frequency of the power transmitting coil or the power receiving coil is varied such that the phase difference between them becomes a target value.

16 Claims, 13 Drawing Sheets

(51) Int. Cl.
*H01F 38/00* (2006.01)
*H02J 5/00* (2016.01)
*H01L 41/08* (2006.01)
*H02M 7/48* (2007.01)
*G06G 7/18* (2006.01)

(58) Field of Classification Search
USPC ..... 307/104, 66, 10.1, 64, 43, 149; 327/338, 327/335, 336; 363/78, 80, 76
See application file for complete search history.

(56) References Cited

U.S. PATENT DOCUMENTS

| | | |
|---|---|---|
| 2007/0222542 A1 | 9/2007 | Joannopoulos et al. |
| 2008/0266748 A1 | 10/2008 | Lee |
| 2008/0278264 A1 | 11/2008 | Karalis et al. |
| 2009/0003022 A1* | 1/2009 | Nunoya ............... B60L 5/005 363/78 |
| 2009/0079268 A1* | 3/2009 | Cook ............... H01Q 1/248 307/104 |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0242407 A1* | 10/2009 | Shiga ............... C02F 1/48 204/557 |
| 2009/0302688 A1 | 12/2009 | Boys |
| 2010/0013322 A1* | 1/2010 | Sogabe ............... H04B 5/0093 307/104 |
| 2010/0133917 A1* | 6/2010 | Sekino ............... H02J 7/025 307/104 |
| 2011/0049995 A1 | 3/2011 | Hashiguchi |
| 2011/0050140 A1 | 3/2011 | Sakai et al. |
| 2011/0074348 A1 | 3/2011 | Villa Gazulla et al. |
| 2011/0084752 A1* | 4/2011 | Julstrom ............... H02J 7/025 327/336 |

FOREIGN PATENT DOCUMENTS

| | | |
|---|---|---|
| CN | 1768467 A | 5/2006 |
| CN | 101258658 A1 | 9/2008 |
| JP | 06-150079 | 5/1994 |
| JP | 11-155245 | 6/1999 |
| JP | 2001-178027 | 6/2001 |
| JP | 2005-313884 | 11/2005 |
| JP | 2008-508842 | 3/2008 |
| JP | 2009-501510 | 1/2009 |
| JP | 2009-539343 | 11/2009 |
| JP | 2011-050140 | 3/2011 |
| WO | WO 94/28560 | 12/1994 |
| WO | WO 98/34319 | 8/1998 |
| WO | WO 2006/011769 | 2/2006 |
| WO | WO 2007/008646 | 1/2007 |
| WO | WO 2007/139401 | 12/2007 |
| WO | WO 2008/118178 A8 | 10/2008 |
| WO | WO 2009/023155 A2 | 2/2009 |
| WO | WO 2009/144355 A2 | 12/2009 |

OTHER PUBLICATIONS

Japanese Office Action issued for corresponding Japanese Application No. 2011-553626, dated Sep. 17, 2013 (with full translation).
Chinese Office Action issued in corresponding Chinese App. No. 201080063241.0, issued Nov. 15, 2014 (with translation).
Japanese Office Action issued in corresponding Japanese App. No. 2013-238048, mailed Aug. 19, 2014 (with translation).
International Search Report issued in International App. No. PCT/JP2010/000847, mailed May 11, 2010.
Korean Office Action issued in corresponding Korean Application No. 10-2012-7020642, mailed Jan. 27, 2014 (with translation).
Office Action dated May 19, 2015 for corresponding Chinese patent application No. 201080063241.0. Full Translation of the Office Action.
Office Action dated Mar. 26, 2014 for corresponding Chinese patent application No. 201080063241.0. Full Translation of the Office Action.
Japanese office action issued in Japanese App. No. 2011-553626, mailed May 7, 2013 (with 2translation).
Official Communication dated Nov. 22, 2016 for corresponding European patent application No. 10845676.5.
Supplemental EP Search Report issued in corresponding European patent application No. 10 84 5676.5, dated Feb. 24, 2017.

* cited by examiner

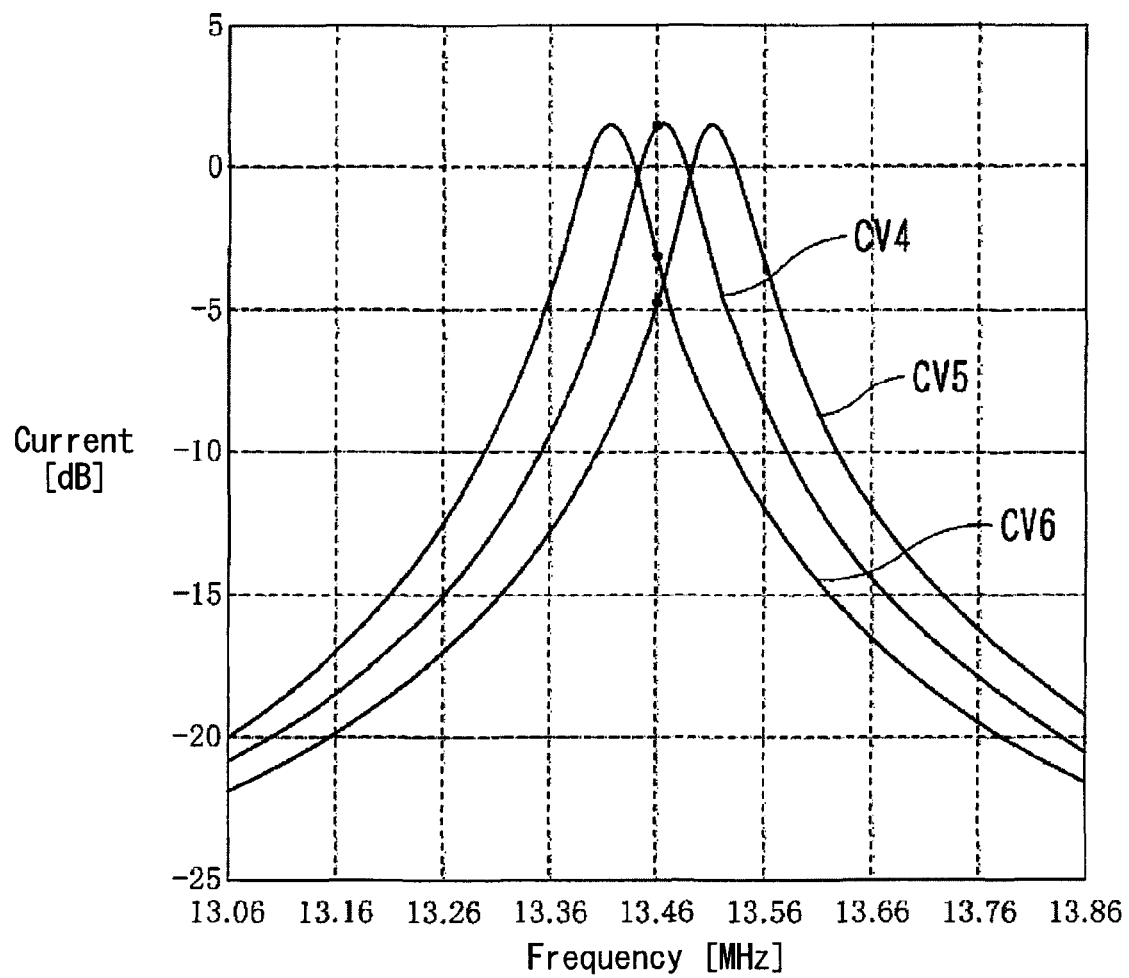
F I G. 1 0

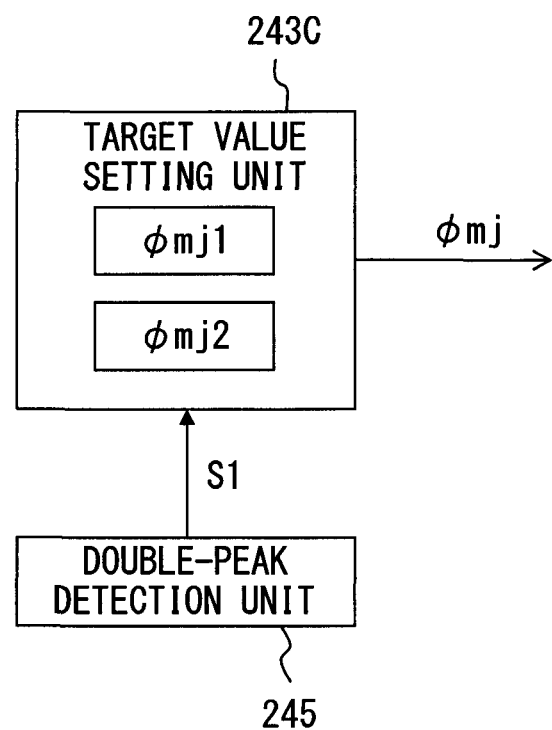
F I G. 1 1

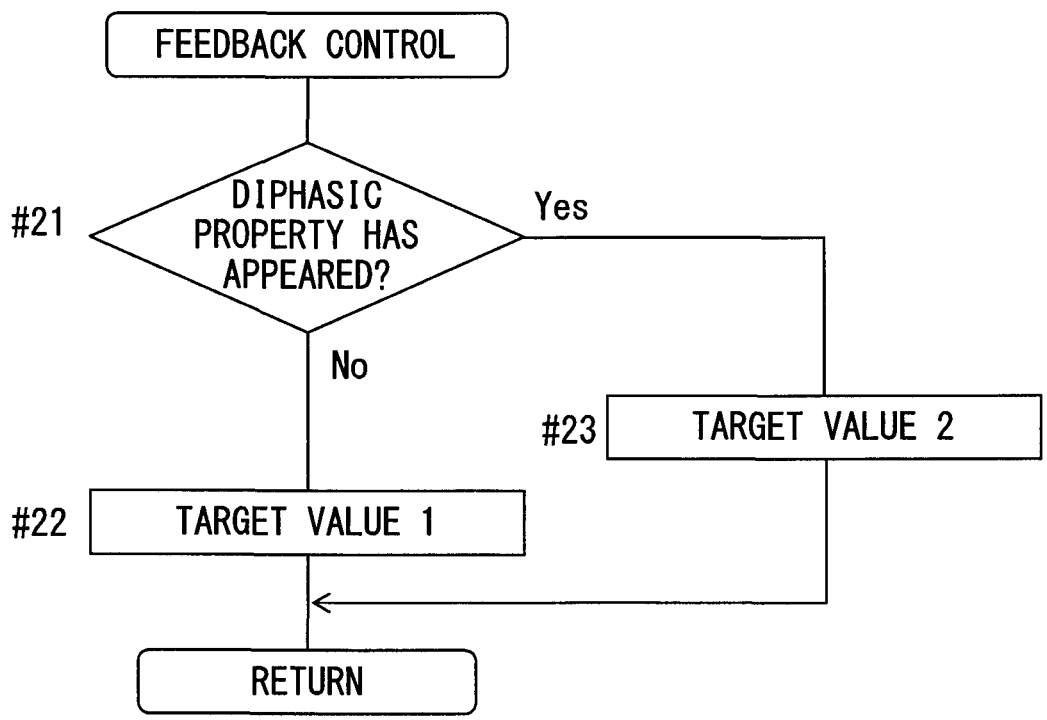
F I G. 1 3

RESONANT FREQUENCY CONTROL METHOD, ELECTRIC POWER TRANSMITTING DEVICE, ELECTRIC POWER RECEIVING DEVICE IN MAGNETIC RESONANT TYPE POWER TRANSMISSION SYSTEM

CROSS-REFERENCE TO RELATED APPLICATIONS

This application is a continuation application of International Application PCT/JP2010/000847 filed on Feb. 10, 2010 and designated the U.S., the entire contents of which are incorporated herein by reference.

BACKGROUND OF THE INVENTION

The present invention relates to a resonant frequency control method, an power transmitting device and a power receiving device in a magnetic resonant coupling type power transmission system.

DESCRIPTION OF THE RELATED ART

In a so-called Wireless Power Transmission or Wireless Power Supply (WPS) to transmit power wirelessly, power (energy) is transmitted and received between two points that are apart spatially, without using any cables. There are two types of wireless power transmission systems: one type of systems uses electromagnetic induction and another type of systems uses radio waves. A system that uses magnetic resonant coupling (also called magnetic field resonant coupling, magnetic resonance, magnetic field resonant mode) has also been proposed (Patent Document 1).

[Patent Document 1] International Publication Pamphlet No. WO 98/34319

SUMMARY OF THE INVENTION

An objective of the present invention is to make it possible to control the resonant frequency of a coil at a high speed and with a high accuracy in real time.

A magnetic resonant coupling type power transmission system to which the present invention is applied will be explained.

The systems that use magnetic resonance (magnetic resonant coupling type) has advantages such as that a larger power may be transmitted compared with the systems that use radio wave, that the transmission distance may be longer, and/or that the coil for power transmission/reception may be smaller compared with the electromagnetic induction coupling type systems.

In the systems that use magnetic resonance, it becomes possible to transmit energy with a high efficiency by setting the resonant frequency of the power transmitting coil and the power receiving coil at the same value with each other and transmitting power at a frequency around to it.

In order to increase the efficiency of power transmission in the magnetic resonant coupling type power transmission systems, there is one in which a higher frequency compared with the frequency of the oscillation signal at the primary coil side is set as the resonant frequency for the secondary coil side (Patent Document 1). According to this, it is said that the capacitance may be smaller and the coupling coefficient of the primary coil and the secondary coil may be seemingly increased.

By increasing the degree of coupling between coils, the efficiency of power transmission may be increased to a certain degree.

In addition, in order to increase the efficiency of power transmission, it may be considered to make the resonant peak of each coil as sharp as possible. In order to do so, the design may be made such that the Q value of each coil becomes high, for example.

However, there is a problem in which, when the Q value is high, the sensitivity to the difference between the resonant frequencies of the coils becomes high, that is, the influence of the difference between the resonant frequencies of the both coils on the decrease of the efficiency of power transmission becomes large.

For example, due to a change in the environmental factors such as the temperature, a change in the inductance or the capacitance by the approach of a conducting body or a magnetic body, or the like, the resonant frequency of a coil may change. In addition, the frequency may also be shifted due to variation at the time of manufacturing.

For this reason, in order to take advantages of its merits in the magnetic field resonant coupling type power transmission system with a high Q value, a mechanism to adjust the resonant frequency of the coil according to the change in the environment and the like is needed.

In order to match the resonant frequency of the coil to a target frequency, the L (inductance) of the coil or the C (capacitance) of the capacitor needs to be adjusted.

In a method of an embodiment described herein, a resonant frequency control method in a magnetic resonant coupling type power transmission system transmitting an electric power from a power transmitting coil to a power receiving coil using magnetic field resonance, includes: a phase of a voltage supplied to the power transmitting coil and a phase of a current that flows in the power transmitting coil or the power receiving coil is detected, and a resonant frequency of the power transmitting coil or the power receiving coil is varied such that phase difference between them becomes a target value.

It is also possible to vary the resonant frequency of the power transmitting coil or the power receiving coil such that the current peak appears at the frequency of the alternating-current power supply when the degree of coupling between the power transmitting coil and the power receiving coil increases and a diphasic property appears.

Meanwhile, in a device of an embodiment described herein, a magnetic resonant coupling type power transmission system transmitting an electric power from a power transmitting coil to a power receiving coil using magnetic field resonance includes: a phase detection unit configured to detect a phase of a voltage supplied to the power transmitting coil and a phase of a current that flows in the power transmitting coil or the power receiving coil; and a resonant frequency control unit configured to vary a resonant frequency of the power transmitting coil or the power receiving coil such that a phase difference between the detected phases becomes a target value.

The object and advantages of the invention will be realized and attained by means of the elements and combinations particularly pointed out in the claims.

It is to be understood that both the foregoing general description and the following detailed description are exemplary and explanatory and are not restricted of the invention, as claimed.

BRIEF DESCRIPTION OF THE DRAWINGS

FIG. 10 is a diagram illustrating a method to sweep the resonant frequency of the coil.

FIG. 11 is a diagram illustrating an example of the configuration to switch between resonant frequency control and diphasic resonant control.

FIG. 13 is a flowchart illustrating an outline process procedure of resonant frequency control.

DESCRIPTION OF THE PREFERRED EMBODIMENTS

In the power transmission system (power transmission device) 1 of the embodiments described below, based on the phase difference $\Delta\phi$ between phases of the voltage of the alternating-current power source (drive voltage) and the current flowing in the coil, real-time resonant frequency control is performed for L or C of the coil (resonant circuit).

In addition, when a diphasic property (split) appears as the coupling between the power transmitting coil and the power receiving coil increases, in order to suppress the decrease of the efficiency in power transmission, the resonant frequency of the frequencies of the power transmitting coil and the power receiving coil is shifted such that the peak (split peak) appears in the frequency of the alternating-current power source. The resonant frequency control in this case may be referred to as "diphasic resonant control" to distinguish it from the resonant frequency control in the case without the appearance of the diphasic property.

In addition, the resonant frequency control in the case in which the "diphasic resonant control" is not included may be referred to as "normal resonant frequency control". When described simply as "resonant frequency control", it includes "diphasic resonant control" in principle.

Figure 1:
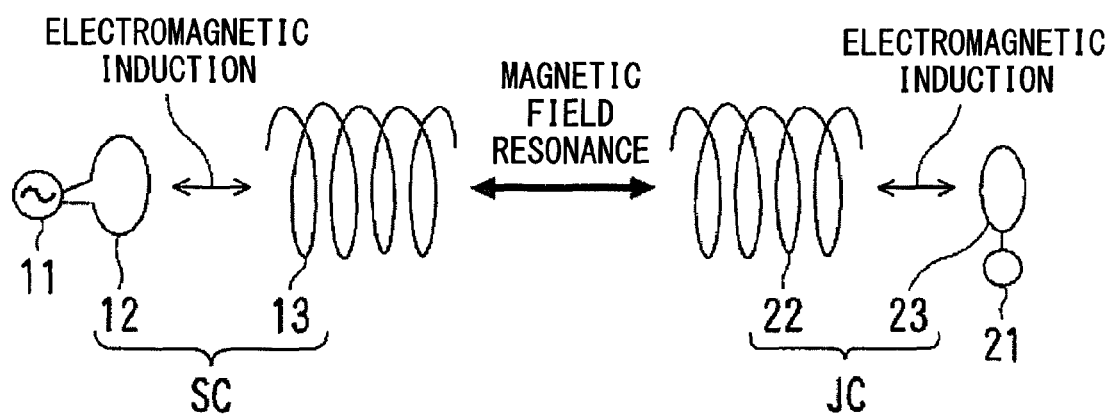
FIG. 1 is a diagram illustrating a magnetic field resonant coupling type power transmission method.
Figure 2:
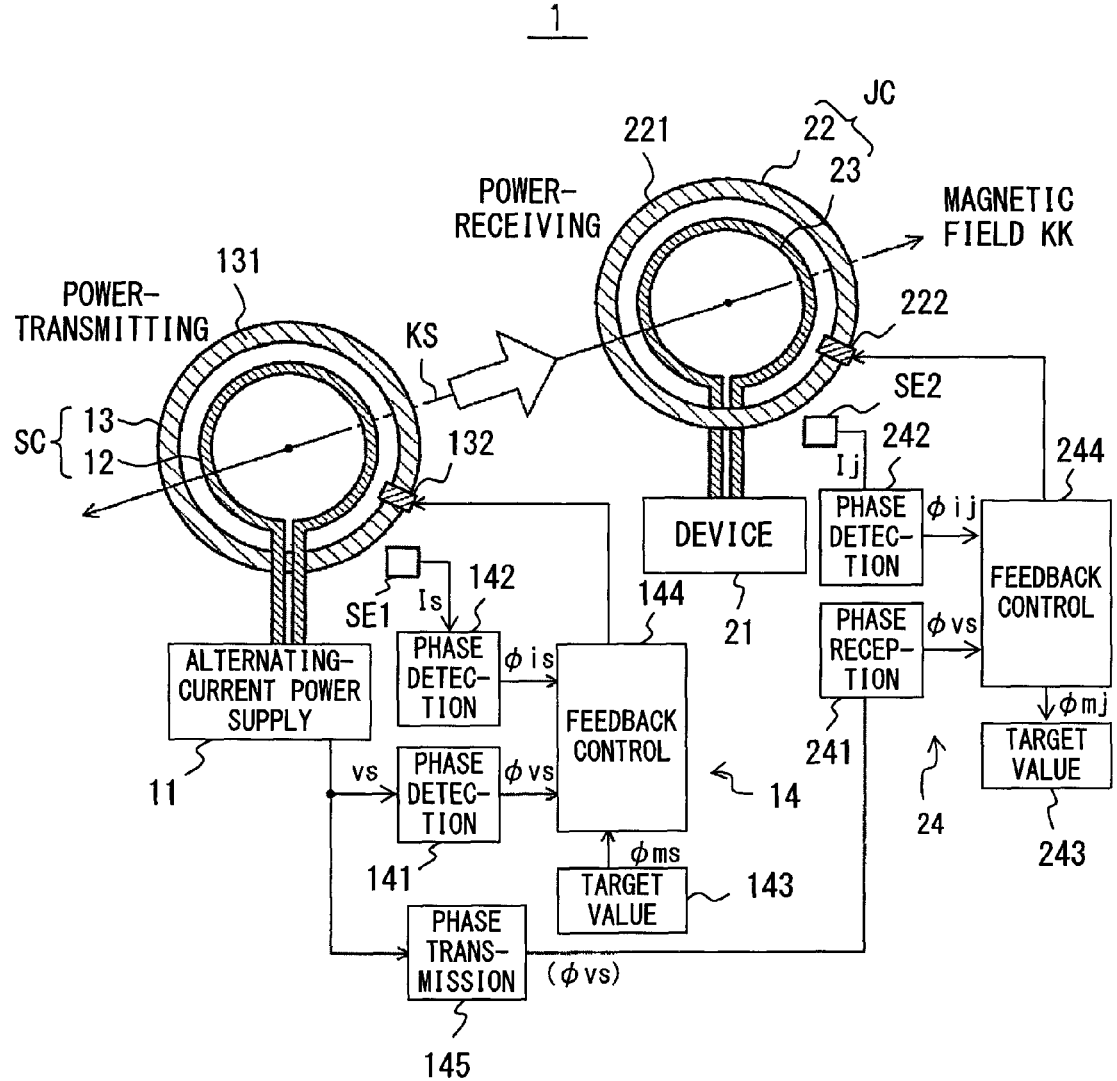
FIG. 2 is a diagram illustrating an outline of a magnetic field resonant coupling type power transmission method.

In FIG. 1 and FIG. 2, the power transmission system 1 has a power transmitting coil SC, a power receiving coil JC, an alternating-current power supply 11, power-transmitting side control unit 14, a device 21 to be a load, and a power-transmitting side control unit 24.

In FIG. 2, the power transmitting coil SC has a power supplying coil 12 and a power transmitting resonant coil 13. The power supplying coil 12 is made by winding multiple turns of a metal wire such as a copper wire or an aluminum wire in a circumferential manner, and an alternating-current voltage (high frequency voltage) is applied to both ends of it.

The power transmitting resonant coil 13 consists of a coil 131 made by winding multiple turns of a metal wire such as a copper wire or an aluminum wire in a circumferential manner and a capacitor 132 connected to the both ends of the coil 131, and forms a resonant circuit of them. The resonant frequency f0 is expressed in the following (1) formula.

$$f_0 = \frac{1}{2\pi\sqrt{LC}} \qquad \text{[Formula 1]}$$

where L is the inductance of the coil 131, and C is the capacitance of the capacitor 132.

The coil 131 of the power transmitting resonant coil 13 is a one turn coil for example. As the capacitor 132, various types of capacitors can be used, but one with the smallest possible loss and the sufficient pressure resistance is preferable. In this embodiment, in order to make the resonant frequency variable, a variable capacitor is used as the capacitor 132. As the variable capacitor, for example, a variable capacity device made using the MEMS technology is used. It may also be a variable capacity device (varactor) using a semiconductor.

The power supplying coil 12 and the power transmitting resonant coil 13 are placed to be electromagnetically coupled closely to each other. For example, they are placed on the same plane and concentrically. That is, for example, they are placed in a state in which the power supplying coil 12 is fit in the inner circumference side of the power transmitting resonant coil 13. Alternatively, they may be placed coaxially with a suitable distance.

In this state, when an alternating current voltage is supplied from the alternating-current power supply 11 to the power supplying coil 12, a resonant current flows in the power transmitting resonant coil 13 by the electromagnetic induction by the alternating magnetic field generated in the power supplying coil 12. That is, electric power is supplied from the power supplying coil 12 to the power transmitting resonant coil 13 by electromagnetic induction.

The power receiving coil JC has a power drawing coil 23. The power receiving resonant coil 22 consists of a coil 221 made by winding multiple turns of a metal wire such as a copper wire or an aluminum wire in a circumferential manner and a capacitor 222 connected to the both ends of the coil 221. The resonant frequency f0 is expressed in the following (1) formula.

The coil 221 of the power receiving resonant coil 22 is a one turn coil for example. As the capacitor 222, various types of capacitors are used as described above. In this embodiment, in order to make the resonant frequency variable, a variable capacitor is used as the capacitor 222. As the variable capacitor, for example, a variable capacity device made using the MEMS technology is used. It may also be a variable capacity device (varactor) using a semiconductor.

The power drawing coil 23 is made by winding multiple turns of a metal wire such as a copper wire or an aluminum wire in a circumferential manner and a device 21 being a load is connected to the both ends of the coil 221.

The power receiving resonant coil 22 and the power drawing coil 23 are placed to be electromagnetically coupled closely to each other. For example, they are placed on the same plane and concentrically. That is, for example, they are placed in a state in which the power drawing coil 23 is fit in the inner circumference side of the power receiving resonant coil 22. Alternatively, they may be placed coaxially with a suitable distance.

In this state, when a resonant current flows in the power receiving resonant coil 22 with generating the alternating magnetic field, the electromagnetic induction causes a current to flow in the power drawing coil 23. That is, the electromagnetic induction causes electric power to sent from the power receiving resonant coil 22 to the power drawing coil 23.

In order to transmit electric power wirelessly by the magnetic field resonance, the power transmitting coil SC and the power receiving coil JC are placed within a range of a suitable distance with each other such that their coil planes are parallel to each other and their coil axis centers correspond with each other or does not shift from each other so much, as illustrated in FIG. 2. For example, when the diameter of the power transmitting resonant coil 13 and the power receiving resonant coil 22 is about 100 mm, they are placed within a range of about several hundred mm distance.

In the power transmission system 1 illustrated in FIG. 2, the direction along the coil axis center KS is the main radiation direction of the magnetic field KK, and the direction from the power transmitting coil SC to the power receiving coil JC is the power transmitting direction SH.

Here, when both the resonant frequency fs of the power transmitting resonant coil 13 and the resonant frequency fj of the power receiving resonant coil 22 coincide with the frequency fd of the alternating-current power supply 11, the maximum power is transmitted. However, if those resonant frequencies fs, fj deviate from each other, or they deviate from the frequency fd of the alternating-current power supply 11, the transmitted power decreases, and the efficiency decreases.

Figure 9:
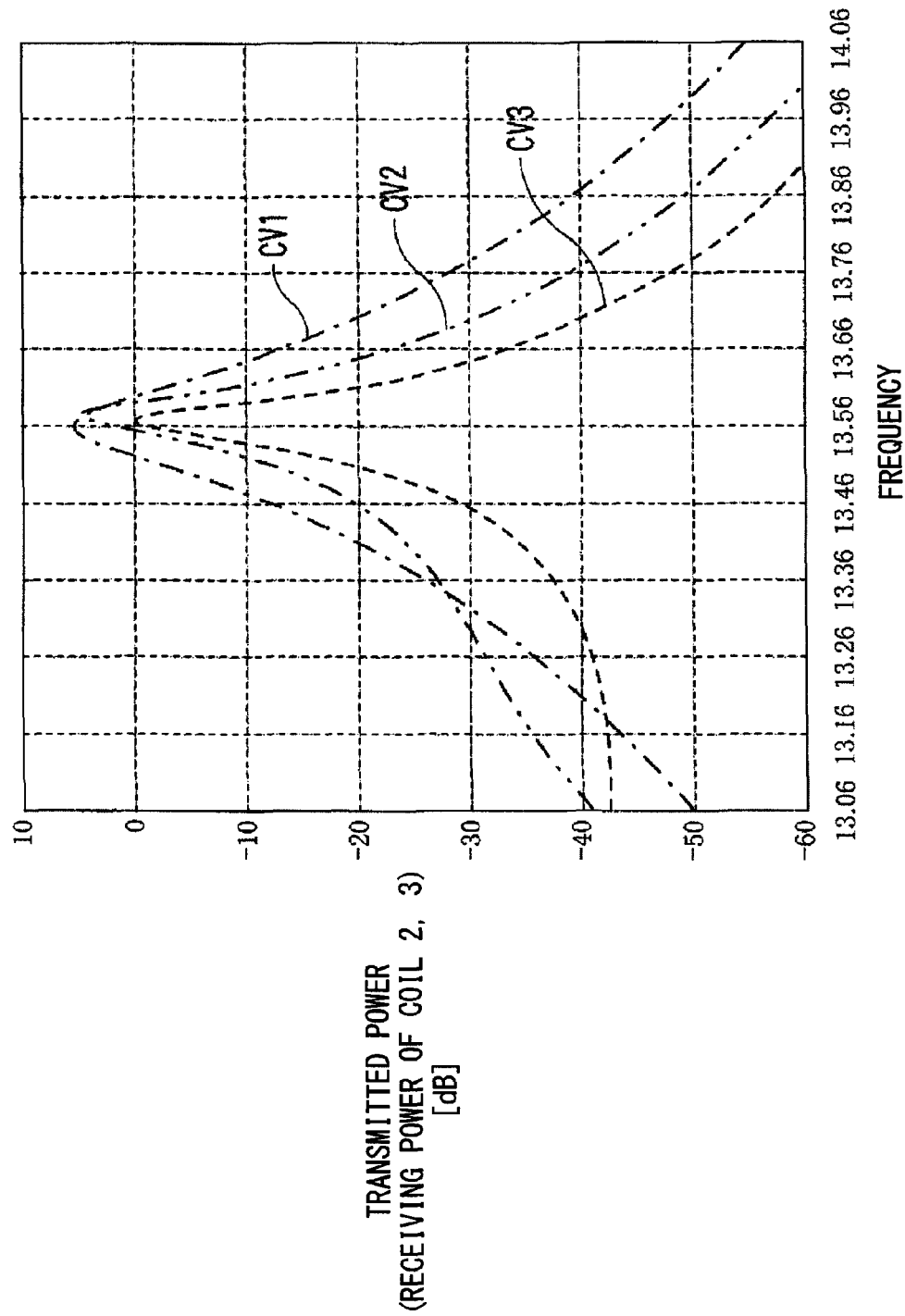
FIG. 9 is a diagram illustrating the frequency dependence of the power transmission system.

That is, in FIG. 9, the horizontal axis is the frequency fd[MHz] of the alternating-current power supply 11, and the vertical axis is the magnitude of the transmitted power [dB]. The curve CV1 represents the case in which the resonant frequency fs of the power transmitting resonant coil 13 and the resonant frequency fj of the power receiving resonant coil 22 coincide with each other. In this case, according to FIG. 9, the resonant frequencies fs, fj is 13.56 MHz.

Meanwhile, the curves CV2, CV3 represents the cases in which the resonant frequency fj of the power receiving resonant coil 22 is higher than the resonant frequency fs of the power transmitting resonant coil 13 by 5% and 100, respectively.

In FIG. 9, when the frequency fd of the alternating-current power supply 11 is 13.56 MHz, the maximum power is transmitted the case shown in the curve CV1, but in the case shown in the curves CV2, CV3, it sequentially decreases. Meanwhile, when the frequency fd of the alternating-current power supply 11 shifts from 13.56 MHz, the transmitted power decreases in all of the curves CV1-CV3 except when it slightly shifts upward.

Therefore, there is a need for matching the resonant frequencies fs, fj of the power transmitting resonant coil 13 and the power receiving resonant coil 22 to the frequency fd of the alternating-current power supply 11 as much as possible.

In FIG. 10, the horizontal axis is the frequency [MHz] and the vertical axis is the magnitude [dB] of the current that flows in the coil. The curve CV4 represents the case in which the resonant frequency of the coil corresponds to the frequency fd of the alternating-current power supply 11. In this case, in FIG. 10, the resonant frequency is 10 MHz.

In addition, the curves CV5, CV6 represents the cases in which the resonant frequency of the coil becomes higher or lower with respect to the frequency fd of the alternating current power supply 11.

In FIG. 10, the maximum current flows in the case shown in the curve CV4, but the current decreases in both cases shown in the curves CV5, CV6. Meanwhile, if the Q value of the coil is high, the influence of the deviation of the resonant frequency on the decrease in the current or the transmitted power is large.

Therefore, in the power transmission system 1, resonant frequency control is performed by the power transmitting side control unit 14 and the power transmitting side control unit 24, using the phase $\phi vs$ of the alternating-current power supply 11 and the phases $\phi is$, $\phi ij$ of the current flowing in the power transmitting resonant coil 13 and the power receiving resonant coil 22.

Here, the power-transmitting side control unit 14 detects the phase $\phi vs$ of the voltage Vs supplied to the power transmitting coil SC and the phase $\phi is$ of the current Is that flows in the power transmitting coil SC, and varies the resonant frequency fs of the power transmitting coil SC such that the phase difference $\Delta \phi s$ between them becomes a predetermined target value $\phi ms$.

That is, the power-transmitting side control unit 14 has a current detection sensor SE1, a phase detection units 141, 142, a target value setting unit 143, a feedback control unit 144, and a phase transmission unit 145.

The current detection sensor SE1 detects the current Is that flows in the power transmitting resonant coil 13. As the current detection sensor SE1, a hole element, a magnetic resistant element or a detection coil or the like may be used. The current detection sensor SE1 outputs a voltage signal according to the waveform of the current Is for example.

The phase detection unit 14 detects the phase $\phi vs$ of the voltage Vs supplied to the power supplying coil 12. The phase detection unit 141 outputs, for example, a voltage signal according to the voltage Vs. In this case, the voltage Vs may be output without any changes, or may be divided by a suitable resistor. Therefore, the phase detection unit 141 may be constituted by a simple electric wire, or by one or more resistors.

The phase detection unit 142 detects the phase $\phi is$ of a current Is that flows in the power transmitting resonant coil 13, based on the output from the current detection sensor SE1. The phase detection unit 142 outputs, for example, a voltage signal according to the waveform of the current Is. in this case, the phase detection unit 142 may output the output of the current detection sensor SE1 without any changes. Therefore, it is possible to configure the current detection sensor SE1 to act as the phase detection unit 142.

The target value setting unit 143 sets and stores the target value $\phi ms$ of the phase difference $\Delta \phi s$. Therefore, a memory for storing the target value $\phi ms$ is provided in the target value setting unit 143. As the target value $\phi ms$, as described later, for example, "$-\pi$" or "a value in which a suitable correction value a is added to $-\pi$" is set.

Meanwhile, the setting of the $\phi ms$ may be performed by selecting from one or a plurality of data stored in advance, or may be performed by an instruction from the CPU, keyboard or the like.

The feedback control unit 144 varies the resonant frequency fs of the power transmitting resonant coil 13 such that the phase difference $\Delta \phi s$ between the phase $\phi vs$ of the voltage Vs of the alternating-current power supply 11 and the phase $\phi is$ of the current Is of the power transmitting resonant coil 13 becomes the target value $\phi ms$.

The phase transmission unit 145 transmits information about the phase $\phi vs$ of the voltage Vs supplied to the power supplying coil 12 to the power-transmitting side control unit 24 wirelessly for example. The phase transmission unit 145 transmits, for example a voltage signal according to the waveform of the voltage Vs to as an analog signal or a digital signal. In this case, in order to improve the S/N ratio, the voltage signal according to the waveform of the voltage Vs may be multiplied by an integer and transmitted.

The power-transmitting side control unit 24 detects the phase φvs of the voltage VS supplied to the power transmitting coil SC and the phase φij of the current IJ that flows in the power receiving coil, and varies the resonant frequency fj of the power receiving coil such that the phase difference Δφj between them becomes a predetermined target value φmj.

That is, the power-transmitting side control unit 24, a current detection sensor SE2, a phase reception unit 241, a phase detection unit 242, a target value setting unit 243, and a feedback control unit 244.

The current detection sensor SE2 detects the current Ij that flows in the power receiving resonant coil 22. As the current detection sensor SE2, a hole element, a magnetic resistant element or a detection coil or the like may be used. The current detection sensor SE2 outputs a voltage signal according to the waveform of the current Ij for example.

The phase reception unit 241 receives information about the phase φvs transmitted from the phase transmission unit 145, and outputs the information. If the voltage signal has been multiplied in the phase transmission unit 145, frequency dividing is performed to reset at the phase reception unit 241. The phase reception unit 241 outputs a voltage signal according to the voltage Vs for example.

The phase detection unit 242 detects the phase φij of the current Ij that flows in the power receiving resonant coil 22, based on the output from the current detection sensor SE2. The phase detection unit 242 outputs, for example, a voltage signal according to the waveform of the current Ij. In this case, the phase detection unit 242 may output the output of the current detection sensor SE2 without any changes. Therefore, it is possible to configure the current detection sensor SE2 to act as the phase detection unit 142.

The target value setting unit 243 sets and stores the target value φmj of the phase difference Δφj. As the target value φmj, as described later, for example, a value in which "−π/2" is added to the target value φms in the power-transmitting side control unit 14 is set. That is, as the target value φmj, "−3π/2" is set. Alternatively, a value in which a suitable correction value b is added is set. Meanwhile, the setting method of the target value φmj and the like may be similar to the case of the target value φms.

The feedback control unit 244 varies the resonant frequency fj of the power receiving resonant coil 22 such that the phase difference Δφj between the phase φvs of the voltage Vs of the alternating-current power supply 11 and the phase φij of the current Ij of the power receiving resonant coil 22 becomes the target value φmj.

Meanwhile, the target value setting unit 143 and the feedback control unit 144 in the power-transmitting side control unit 14, the target value setting unit 243 and the feedback control unit 244 in the power-transmitting side control unit 24 are examples of the resonant frequency control unit.

Figure 3:
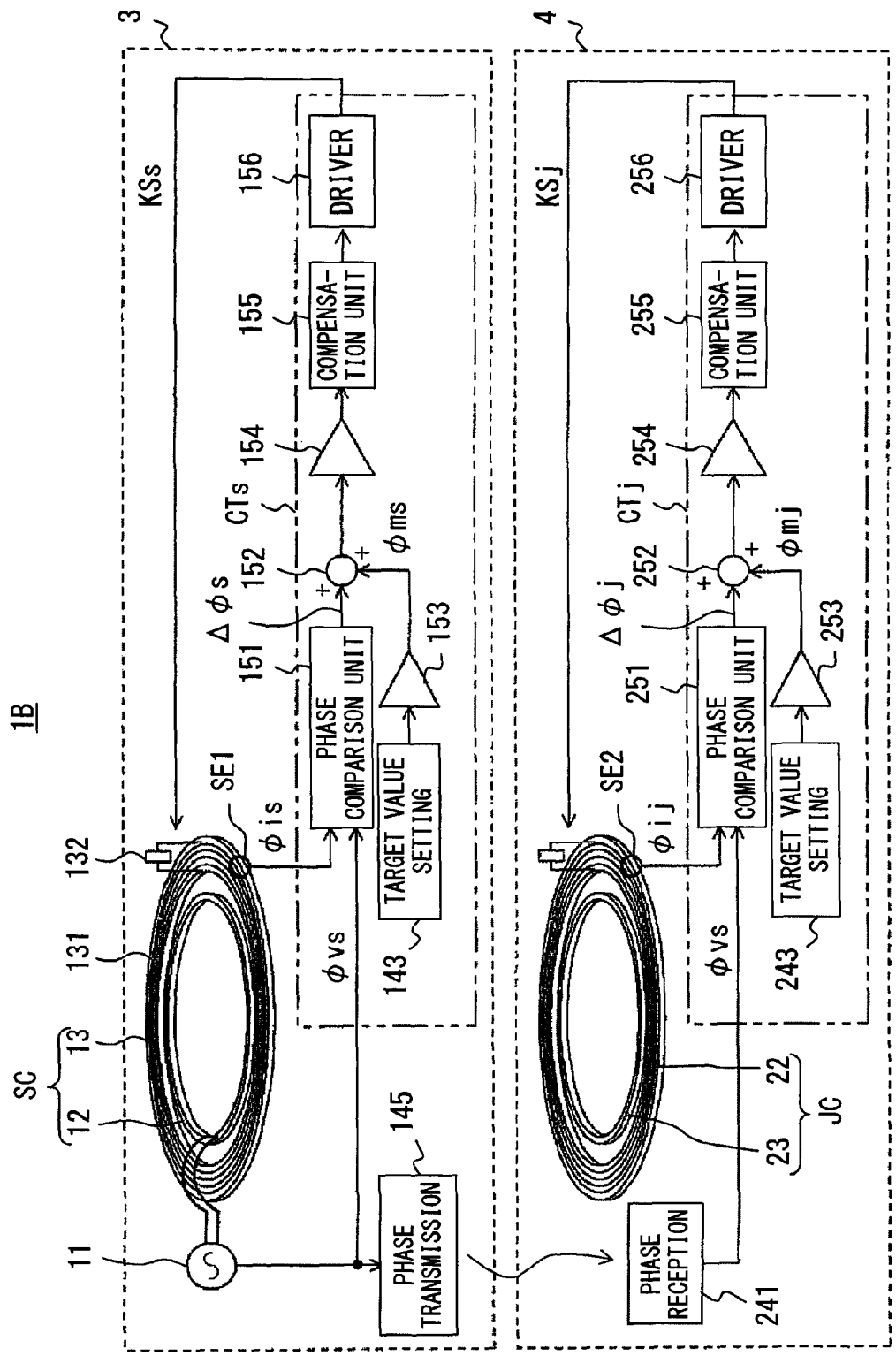
FIG. 3 is a diagram illustrating an example of the configuration of a control unit of a power transmission system of the present embodiment.

Hereinafter, more detail explanation will be provided referring to FIG. 3. In FIG. 3, the same numerals are assigned to the elements having the same function as the elements illustrated in FIG. 2, and explanation for them may be omitted or simplified.

In FIG. 3, the power transmission system (power transmission device 1B) has a transmitting device 3 and a power receiving device 4.

The power transmitting device 3 has a power transmitting coil SC consisting of an alternating-current power supply 11, a power supplying coil 12 and a power transmitting resonant coil 13, and a resonant frequency control unit CTs and the like.

The power receiving device 4 has a power receiving coil consisting of a power receiving resonant coil 22 and a power drawing coil 23, a resonant frequency control unit CTj, and the like.

The resonant frequency control unit CTs at the power transmitting side has a target value setting unit 143, phase comparison unit 151, an addition unit 152, gain adjustment units 153, 154, a compensation unit 155, and a driver 156.

The phase comparison unit 151 compares the φis of the current Is detected by the current detection sensor SE1 and the phase φvs of the voltage Vs of the alternating-current power supply 11, and outputs the phase difference Δφs being the difference between them.

The addition unit 152 adds the phase difference Δφs that the phase comparison unit 151 outputs and the target value φms set by the target value setting unit 143. Since the target value φms is set to have an opposite positive/negative sign with respect to the target phase difference Δφs in this embodiment, when the absolute values of the phase difference Δφs and the target value φms are coincided with each other, the output of the addition unit 152 becomes 0.

The gain adjustment units 153, 154 adjusts the gain with respect to the input value or to data, or performs conversion of data and the like.

The compensation unit 155 for example determines the gain with respect to the low frequency component. The resonant frequency control unit CTs in the present embodiment may be viewed as a component of a servo system that performs feedback control with respect to the MEMS variable capacity device being the capacitor 132. Therefore, for the compensation unit 155, a suitable servo filter for making the servo system more stable with a higher speed and a higher accuracy may be used. In addition, a filter circuit or a differentiation integration circuit for the PID operation to be performed in such a servo system is used as needed.

The driver 156 drives the MEMS variable capacity device being the capacitor 132 and outputs drive KSs to the capacitor 132 for variable control of its capacitance.

In the MEMS variable capacity device (MEMS variable capacitor), a lower part electrode and an upper part electrode are provided on a glass substrate, and the space between them changes by the bend due to electro static attraction force generated by the applied voltage between them, thereby the capacitance between them varies. An electrode for the capacitor and an electrode for driving may also be provided separately. Since the relationship between the voltage applied to the electrode for driving and the variation amount of the capacitance is not linear, a calculation or table conversion is also performed as needed in the driver 156 for the conversion.

The power receiving side resonant frequency control unit CTj has a target value setting unit 243, a phase comparison unit 251, an addition unit 252, gain adjustment units 253, 254, a compensation unit 255, and a driver 256 and the like. The configuration and the operation of each unit of the power receiving side resonant frequency control unit CTj are similar to the configuration and the operation of each unit of the resonant frequency control unit CTs.

Meanwhile, the power-transmitting side control unit 14, power-transmitting side control unit 24, the resonant frequency control units CTs, CTj and the like may be realized by software or hardware, or their combination. For example, the CPU may perform a suitable computer program using a computer consisting of a CPU, a memory such as ROM and RAM and other peripheral devices and the like. In that case, a suitable hardware circuit may be used together.

Next, referring to FIG. 4-FIG. 7, the operation of the resonant frequency control in the power transmission system 1B will be explained.

In FIG. 4-FIG. 7, in each FIG. (A), the horizontal axis represents the frequency f[MHz] of the alternating-current power supply 11, and the vertical axis represents the magnitude [dB] of the current I that flows in each coil. In each FIG. (B), the horizontal axis represents the frequency f[MHz] of the alternating-current power supply 11, and the vertical axis represents the phase ϕ[radian] of the current I that flows in each coil. In each of FIG. 4-FIG. 7, FIG. (A) and FIG. (B) are corresponding.

Meanwhile, the phase ϕ represents the phase difference Δϕ, based on the phase ϕvs of the voltage Vs of the alternating-current power supply 11, that is, the phase ϕvs of the voltage Vs supplied to the power supplying coil 12. That is, the phase ϕ becomes 0 when it corresponds to the phase ϕvs.

In the symbols CAA1-4, CAB1-4, CBA1-4, CBB1-4, CCA1-4, CCB1-4, CDA1-4, CDB1-4, the numbers 1, 2, 3, 4 of the suffixes indicates correspondence with the power supplying coil 12, the power transmitting resonant coil 13, the power receiving resonant coil 22, the power drawing coil 23, respectively.

Then, in the resonant frequency control, the power transmitting resonant coil 13, or power transmitting resonant coil 13 and the power receiving resonant coil 22 are controlled such that their resonant frequencies fs, fj becomes 10 MHz.

These FIG. 4-FIG. 7 illustrate the result of simulation by a computer under these conditions.

Figure 4A:
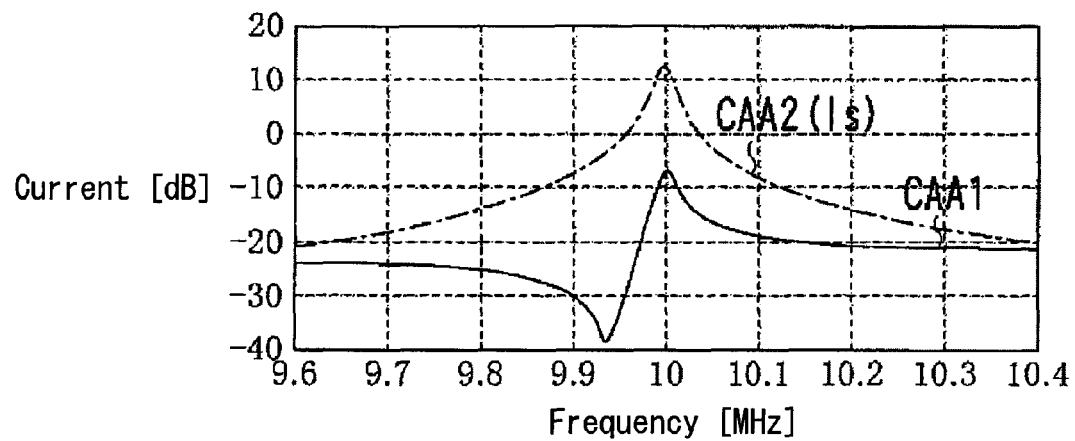
FIGS. 4A-4B are diagrams illustrating the state of the current and phase in resonant frequency control.
Figure 4B:
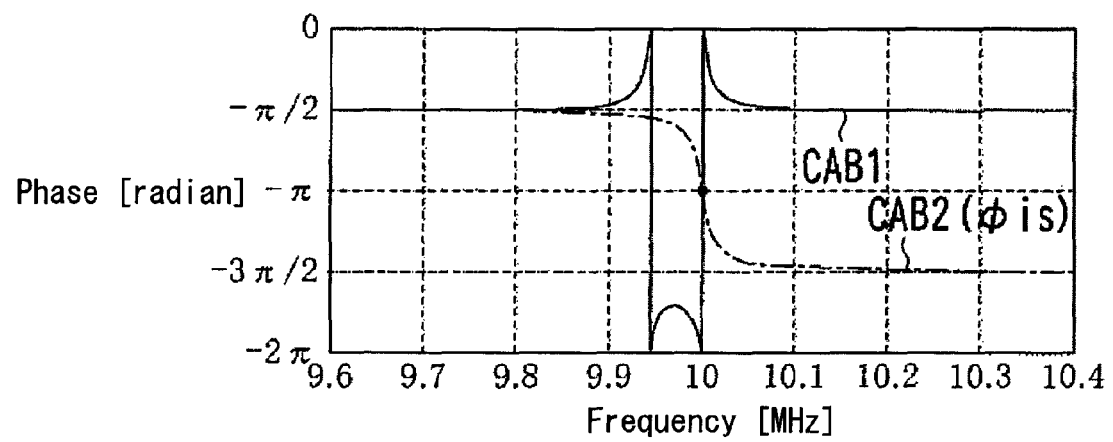

FIGS. 4A-4B represent a case in which the resonant frequency control is performed by only one of the power-transmitting side control unit 14 and the power transmitting device 3, and FIG. 5 represents a case in which the resonant frequency control is performed by both the power-transmitting side control unit 14 or the power transmitting device 3 and the power-transmitting side control unit 24 or the power receiving device 4.

In FIGS. 4A-4B, for the power transmitting resonant coil 13, the resonant frequency control is performed such that its resonant frequency fs becomes 10 MHz. In this case, the frequency fd of the alternating-current power supply 11 is set to 10 MHz, and "$-\pi$" is set as the target value ϕms in the target value setting unit 143.

As illustrated in the curve CAA2m the current Is of the power transmitting resonant coil 13 peaks at 10 MHz that coincides with the frequency fd of the alternating-current power supply 11.

As illustrated in FIG. CAB2, the phase ϕis of the power transmitting resonant coil 13 is $-\pi$ at 10 MHz being the resonant frequency fs. That is, it coincides with the target value ϕms.

Meanwhile, the power transmitting resonant coil 13 may be considered as a serial resonant circuit viewed from the power supplying coil 12. Therefore, at the frequency fd that is lower than the resonant frequency fs, it becomes capacitive and approaches $\pi/2$, and at the higher frequency fd, it becomes inductive and approaches $-3\pi/2$.

As described above, the phase ϕis of the current Is that flows in the power transmitting resonant coil 13 significantly varies around the resonant frequency fs. By performing control under which the phase ϕis, that is, the phase difference Δϕ becomes $-\pi$, the resonant frequency fs of the power transmitting resonant coil 13 may be matched with the frequency fd of the voltage Vs with a high accuracy.

Meanwhile, as illustrated in the curve CAA1, the current I that flows in the power supplying coil 12 also peaks at the resonant frequency fs. As illustrated in the curve CAB1, the phase ϕI of the current I that flows in the power supplying coil 12 becomes 0 or a leading phase around the resonant frequency fs, and becomes $-\pi/2$ when it deviates from the resonant frequency fs.

Figure 5A:
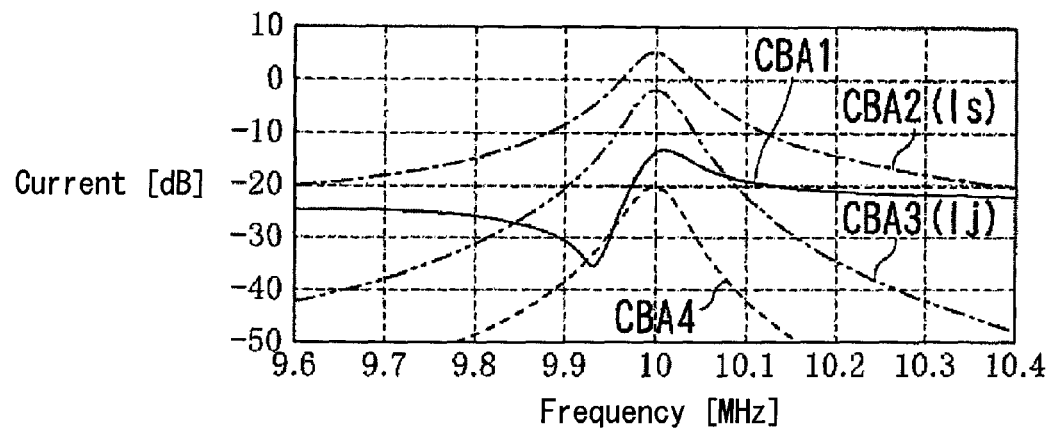
FIGS. 5A-5B are diagrams illustrating the state of the current and phase in resonant frequency control.
Figure 5B:
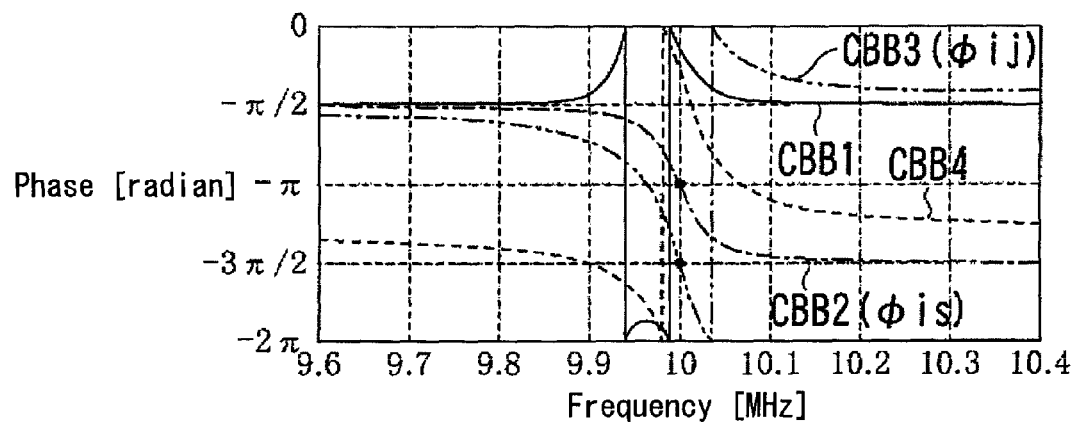

In FIGS. 5A-5B, for the power transmitting resonant coil 13 and the power receiving resonant coil 22, the resonant frequency control is performed such that their resonant frequencies fs, fj becomes 10 MHz. In this case, in the target value setting units 143, 243, "$-\pi$" is set as the target value ϕms, and "$-3\pi/2$" is set as the target value ϕmj.

That is, as the target value ϕmj, the value "ϕms$-\pi/2$" in which $-\pi/2$ is added to the target value ϕms, that is, a phase that is behind the target value ϕms by $\pi/2$ is set.

The curve CBA2 and the curve CBB2 are almost similar to the curve CAA2 and the CAB2 in FIGS. 4A-4B.

As illustrated in the curve CBA3, the current Ij of the power receiving resonant coil 22 peaks at 10 MHz that coincides with the frequency fd of the alternating-current power supply 11.

As illustrated in the curve CBB3, the phase ϕij of the current Ij of the power receiving resonant coil 22 is $-3\pi/2$ at 10 MHz that is the resonant frequency fs. In addition, when the frequency fd becomes lower than the resonant frequency fs, the phase difference Δϕ decreases and approaches $-\pi/2$, and when it becomes higher than the resonant frequency fs, the phase difference Δϕ increases and approaches $-5\pi/2$, that is, $-\pi/2$.

Thus, the phases ϕis, ϕij of the currents Is, Ij that flows in the power transmitting resonant coil 13 and the power receiving resonant coil 22 significantly changes around the resonant frequencies fs, fj. By performing control under which the phases ϕis, ϕij, that is, the phase differences Δϕs, Δϕj become $-\pi$ or $-\pi/2$, the resonant frequencies fs, fj of the power transmitting resonant coil 13 and the power receiving resonant coil 22 may be matched with the frequency fd of the voltage Vs with a high accuracy.

Thus, according to the power transmission system 1, 1B of the present embodiment, the resonant frequency of the power transmitting coil SC and the power receiving coil JC may be controlled at a high speed and with a high accuracy in real time.

Accordingly, the resonant frequencies of the power transmitting coil SC and the power receiving coil JC may be matched with the frequency fd of the alternating-current power supply 11, and the maximum electric power may be transmitted from the power transmitting device 3 to the power receiving device 4 constantly.

For this reason, even if there is change of the environmental factor and the like, the maximum electric power may be transmitted constantly, and the energy transmission may be performed with a high efficiency.

In addition, according to the resonant frequency control method according to the present embodiment, since the control is performed based on the phase difference Δϕ of the coil current with respective to the voltage Vs of the alternating-current power supply, an accurate control may be performed without any influences from the variation in the amplitude of the current as in the case of the sweep search method.

Meanwhile, in the sweep search method, for example, L or C in the power transmitting coil SC or the power receiving coil is swept and the position at which the current value of the coil peaks is searched in a trial-and-error-like manner.

However, there may be following problems in the case of the sweep search method described above. That is, (1) Since the current value of the coil constantly varies depending on the usage state, a detection error occurs due to the variation (amplitude variation) of the current value of the coil, and it is not easy to perform an accurate adjustment. (2) A round-trip sweep operation is needed for the adjustment and time is required for the adjustment, and high-speed real-time control is difficult. In addition, even if the adjustment is performed once, the adjustment needs to be performed again when the usage environment changes, and the usage needs to be stopped at each time.

However, according to the resonant frequency control method according to the present embodiment, since the control is performed in real time, correction is performed constantly for the variation of the frequency fd of the alternating-current power supply 11 and the variation in the environmental factor and the like, there is no need for re-adjustment and stop and the like as in the case of the sweep search method.

In addition, in the power transmission system 1, 1B of the present embodiment, when the Q values of the power transmitting resonant coil 13 and the power receiving resonant coil 22 are high, the sensitivity to the shift between the resonant frequencies of the both coils becomes high.

However, according to the resonant frequency control method of the present embodiment, as the Q value becomes high, the rate of variation around the resonant frequencies of the phases φis, φij increases, and because of this, the sensitivity of the control also becomes high. As a result, the phase differences Δφs, Δφj may be matched with the target values φms, φmj with a higher accuracy, and the power transmission with a higher efficiency may be performed with the increase in the Q value.

Next, the resonant frequency control (diphasic resonant control) when the coupling between the power transmitting coil SC and the power receiving coil increases a diphasic property appears will be explained.

Figure 6A:
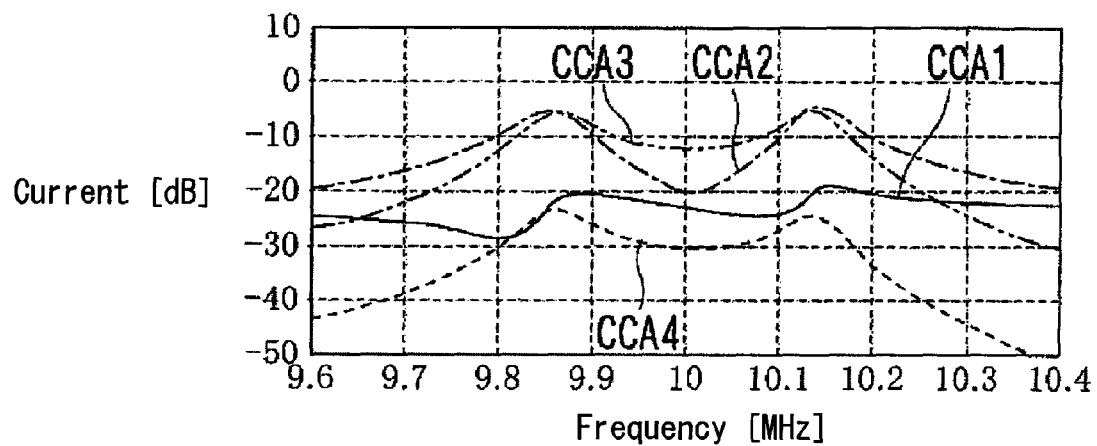
FIGS. 6A-6B are diagrams illustrating the state of the current and phase when the diphasic property appears.
Figure 6B:
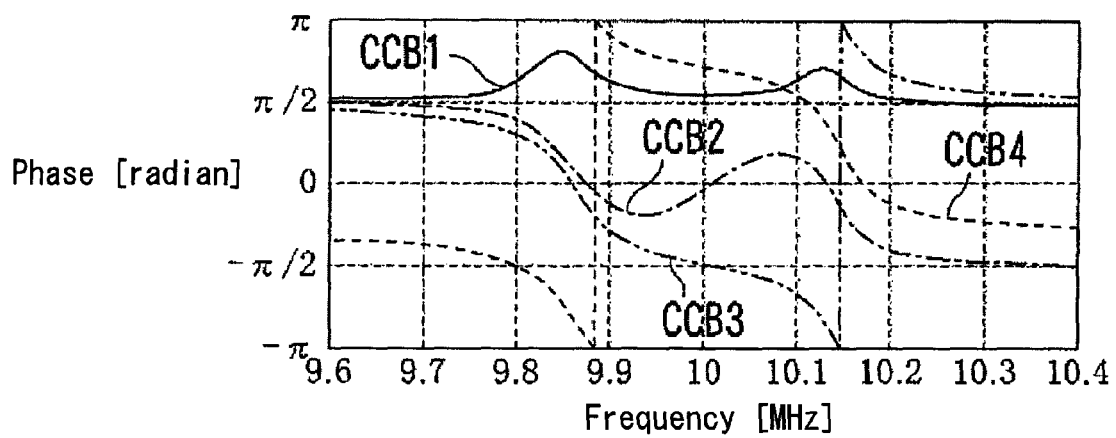

FIGS. 6A-6B illustrate the state of the currents Is, Ij and the phases φis, φij in a case in which the diphasic property appears and the diphasic resonant control is not performed.

That is, the state illustrated in FIG. 6 appears, for example, when operating in the state illustrated in FIG. 5, the coupling increases as the power receiving coil comes closer to the power transmitting coil SC.

The single peak as illustrated in the curves CBA2, CBA3 in FIGS. 5A-5B is diphasic as illustrated in the curves CCA2, CCA3 in FIGS. 6A-6B. Accordingly, at 10 MHz being the resonant frequency, as illustrated in the curve CCA4, the current taken from the power drawing coil 23 becomes lower, and the transmitted power decreases.

Therefore, in the diphasic resonant control, the resonant frequency of the power transmitting coil SC and the power receiving coil are shifted such that one peak of the two peaks appear at 10 MHz being the resonant frequency fs.

For that reason, while "−3π/2" is set as the target value φmj, in the diphasic resonant control, as the target value φmj, a phase in which −π/2 is further added, that is, "−2π" that is further behind by π/2 is set. That is, the target value φmj is switched from "−3π/2" to "−2π".

As described above, in the diphasic resonant control, "−2π" is set as the target value φj for the target value setting unit 243.

The target value φms for the target value setting unit 143 is unchanged "−π". Therefore, the difference between the target value φms and the target value φmj is switched from −π/2 to −π with the shift to the diphasic resonant control.

Figure 7A:
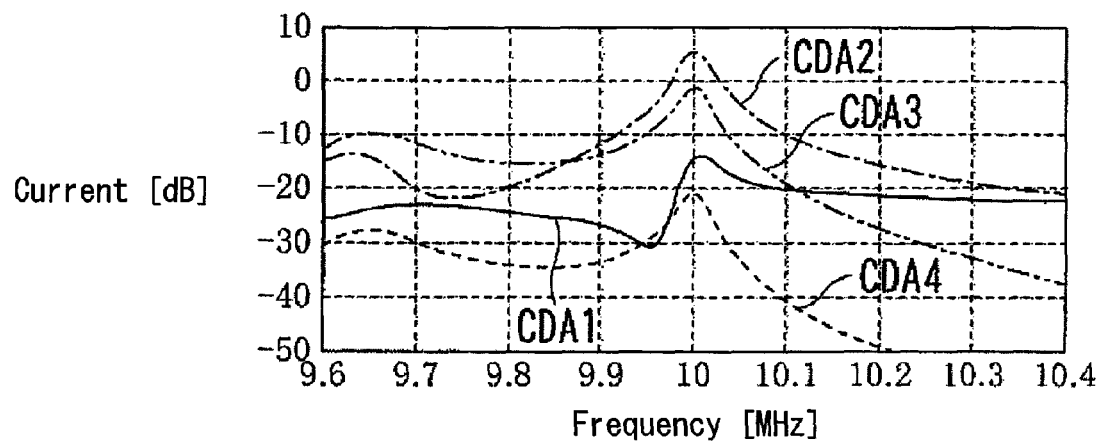
FIGS. 7A-7B are diagrams illustrating the state of the current and phase in resonant frequency control when the diphasic property appears.
Figure 7B:
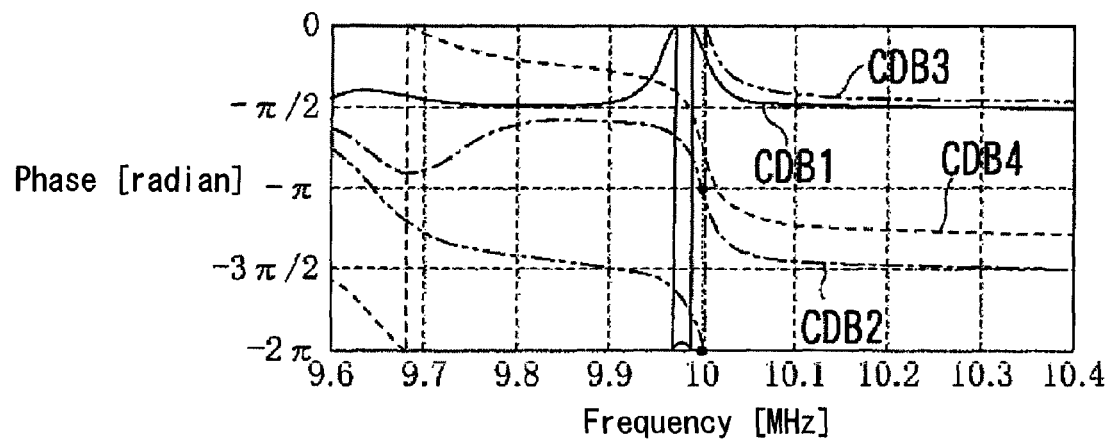

In FIGS. 7A-7B, as illustrated by the curve CDB2, the phase φis of the current Is of the power transmitting resonant coil 13 is −π at 10 MHz that is the resonant frequency fs. In addition, as illustrated by the curve CDB3, the phase φij of the current Ij of the power receiving coil 22 is −2π at 10 MHz being the resonant frequency fs.

As illustrated by the curves CDA2, CDA3, CDA4, the current I of all increases by the diphasic resonant control. For example, in the curve CDA4, the current is about −30 dB with the normal resonant frequency control, but is about −20 dB with the diphasic resonant control, increasing by about 10 dB.

Figure 8:
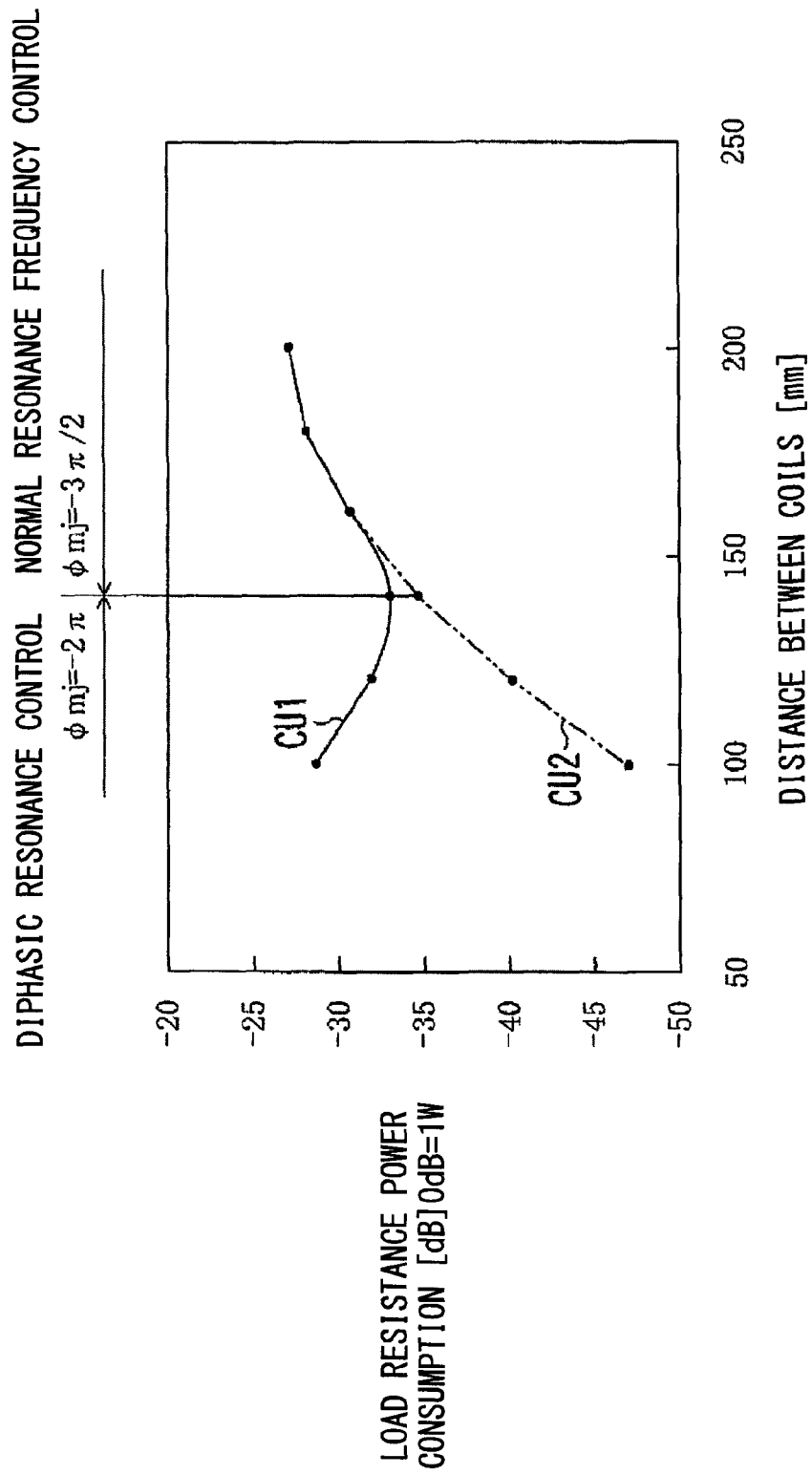
FIG. 8 is a diagram illustrating the change of transmission power when resonant frequency control according to the diphasic property is performed.

FIG. 8 illustrates the state of change of the power drawn from the power drawing coil 23 in a case in which the distance between the power transmitting resonant coil 13 and the power receiving resonant coil 22 is changed between 200 mm and 100 mm.

Meanwhile, FIG. 8 is the result of a simulation performed with the coil diameter 100 mm, a 50 mm the space between the power supplying coil 12 and the power transmitting resonant coil 13, and a 40 mm space between the power receiving resonant coil 22 and the power drawing coil 23. As the device 21 being the load for the power drawing coil 23, a 10Ω resistor was connected.

In FIG. 8, the curve CU1 and the curve CU2 illustrate a case of switching between the normal resonant frequency control and the diphasic resonant control and a case in which the diphasic resonant control was not performed, respectively.

When the diphasic resonant control is not performed, as illustrated by the curve CU2, the power decreases as the distance between coils becomes closer. By contrast, as illustrated by the curve CU1, when switched to the diphasic resonant control when the distance between the coil becomes closer around 140 mm, the power does not decrease but increases instead.

Meanwhile, various methods are possible for the method to automatically switch between the normal resonant frequency control and the diphasic resonant control.

For example, as illustrated in FIG. 11, a target value φmj1 for the normal resonant frequency control and the target value φmj2 for the diphasic resonant control are stored in the target value setting unit 243C. Then, a double-peak detection unit 245 for detecting the appearance of the diphasic property is provided.

The target value setting unit 243C outputs the target value φmj1 as the target value φmj in the normal resonant frequency control, but if the double-peak detection unit 245 detects a detection signal S1, outputs the target value φmj2 as the target value φmj. Accordingly, the normal resonant frequency control and the diphasic resonant control are automatically switched.

Meanwhile, the double-peak detection unit 245 may also detect, for example, the decrease of the transmitted power below a predetermined amount, or, the distance of the power receiving coil becoming closer than predetermined. Alternatively, the two target values φmj1, φmj2 may be switched and output at a suitable timing, and the target value φm with a larger power may be selected.

Next, the resonant frequency control in the power transmission system 1, 1B of the present embodiment will be explained with reference to a flowchart.

Figure 12:
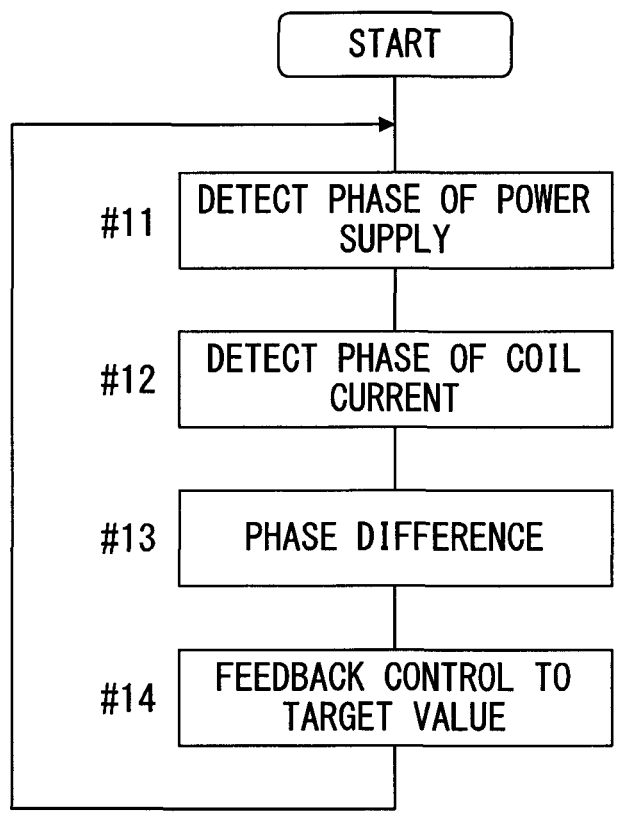
FIG. 12 is a flowchart illustrating an outline process procedure of resonant frequency control.

In FIG. 12, the phase φvs of the alternating-current power supply 11, the phase φvs of the alternating-current power supply 11 is detected (#11), and the phases φis, φij of the power transmitting resonant coil 13 and the power receiving resonant coil 22 are detected (#12), to obtain the phase differences Δφs, Δφj (#13).

Then, feedback control is performed such that the phase differences Δφs, Δφj coincides with the target values φms, φmj.

In FIG. 13, in the feedback control, depending on whether or not the diphasic property has appeared (#21), the target values φmh2, φmj1 are switched (#22, 23).

As described above, by performing the diphasic resonant control when the diphasic property appears, decrease in the transmitted power may be suppressed, and the efficiency of the power transmission may be increased.

Therefore, by switching and performing the normal resonant frequency control and the diphasic resonant control for the case in which the diphasic property appears, the maximum power may be transmitted to the power receiving device 4 constantly, and the energy transmission may be performed with a high efficiency.

In each embodiment described above, $-\pi$ is set as the target value φmj, and $-3\pi/2$ or $-2\pi$ is set as the target value φmj. The value "$-\pi$" set as the target value φmj is an example of the target value "β". The values "$-3\pi/2$" and "$-2\pi$" is an example of the target values "$\beta-\pi/2$" and "$\beta-\pi$", respectively.

These target values φms, φmj may be changed variously according to the configuration of the power-transmitting side control unit 14, the power-transmitting side control unit 24, the feedback control units 144,244, the resonant frequency control units CTs, CTj.

Meanwhile, in this embodiment, the phase and the phase difference are expressed in radian. Assuming a phase or a phase difference as α[radian], this is equivalent to $(\alpha+2n\pi)$ [radian], where n is an arbitrary integer. In addition, the phase and the phase difference may be expressed in degrees instead of radian.

In addition, it has been mentioned that in setting the target values φms, φms, the correction values a, b may be added to those values. Such correction values a, b may be determined such that the maximum power is obtained actually.

In the embodiment described above, the configuration of the phase detection units 141,142 may be changed variously. That is, either the voltage waveform or the current waveform is fine, and a value or data indicating a phase is also fine. That is, a signal or data including phase information about the voltage Vs or the current Is is fine.

In the embodiment described above, the addition unit 152 and the gain adjustment unit 153, and the addition unit 252 and the gain adjustment unit 253 are respectively an example of a calculation unit. While the MEMS variable capacity device being the capacitors 132, 222 are driven by the drivers 156, 256, other types of capacitors may be driven. In addition, driving may be performed by the driver 156 such that the inductance of the coil instead of the capacitor is varied.

In the embodiment described above, the configuration, structure, circuit, shape, number, placement of each part or the entirety of the power transmitting coil SC, the power receiving coil, the power-transmitting side control unit 14, the power-transmitting side control unit 24, the feedback control units 144, 244, the resonant frequency control units CTs, CTj, the power transmitting device 3, the power receiving device 4, the power transmission system 1, 1B may be changed as needed according to the gist of the present invention.

The power transmission system (power transmission device) 1, 1B of the embodiment described above may be applied to charging of a secondary battery built in a mobile device such as a mobile phone, a mobile computer, a portable music player, or, charging of a secondary battery of a transportation machine such as an automobile.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A resonant frequency control method in a magnetic field resonant coupling type power transmission system transmitting an electric power from a power transmitting coil to a power receiving coil using magnetic field resonance, the resonant frequency control method comprising:
   detecting a phase of a voltage supplied to the power transmitting coil and a phase of a current that flows in the power transmitting coil or the power receiving coil; and
   conforming a phase difference between the detected phase of the voltage and the detected phase of the current to a target value by varying a resonant frequency of a resonant circuit including the power transmitting coil or a resonant circuit including the power receiving coil.

2. The resonant frequency control method according to claim 1, wherein:
   the power transmitting coil includes a power supplying coil to which an alternating-current power supply is connected, and a power transmitting resonant coil closely coupled electromagnetically with the power supplying coil;
   the power receiving coil includes a power receiving resonant coil, and a power drawing coil closely coupled electromagnetically with the power receiving resonant coil;
   a resonant frequency of the power transmitting resonant coil is varied such that a phase difference between a voltage of the alternating-current power supply and a current of the power transmitting resonant coil becomes a target value β; and
   a resonant frequency of the power receiving coil is varied such that a phase difference between the voltage of the alternating-current power supply and a current of the power receiving resonant coil becomes a target value $(\beta-\pi/2)$.

3. The resonant frequency control method according to claim 2, wherein:
   the target value β is $-\pi$.

4. The resonant frequency control method according to claim 1, wherein:
   when a degree of coupling between the power transmitting coil and the power receiving coil increases and a diphasic property appears, the resonant frequency of the resonant circuit including the power transmitting coil or the resonant circuit including the power receiving coil is varied such that a peak of a current appears at a frequency of the alternating-current power supply.

5. The resonant frequency control method according to claim 1, wherein:
the power transmitting coil includes a power supplying coil to which an alternating-current power supply is connected, and a power transmitting resonant coil closely coupled electromagnetically with the power supplying coil;
the power receiving coil includes a power receiving resonant coil, and a power drawing coil closely coupled electromagnetically with the power receiving resonant coil;
when a degree of coupling between the power transmitting coil and the power receiving coil increases and a diphasic property appears,
a resonant frequency of the power transmitting resonant coil is varied such that a phase difference between a voltage of the alternating-current power supply and a current of the power transmitting resonant coil becomes a target value $\beta$; and
a resonant frequency of the power receiving coil is varied such that a phase difference between the voltage of the alternating-current power supply and a current of the power receiving resonant coil becomes a target value ($\beta$−n).

6. A magnetic field resonant type power transmission system transmitting an electric power from a power transmitting coil to a power receiving coil using magnetic field resonance, the magnetic field resonant type power transmission system comprising:
a phase detection unit configured to detect a phase of a voltage supplied to the power transmitting coil and a phase of a current that flows in the power transmitting coil or the power receiving coil; and
a resonant frequency control unit configured to conform a phase difference between the detected phase of the voltage and the detected phase of the current becomes a target value by varying a resonant frequency of a resonant circuit including the power transmitting coil or a resonant circuit including the power receiving coil.

7. A power transmission device in a magnetic field resonant coupling type power transmission system transmitting an electric power from a power transmitting coil to a power receiving coil using magnetic field resonant, the power transmission device comprising:
a power transmitting phase detection unit configured to detect a phase of a voltage supplied to the power transmitting coil and a phase of a current that flows in the power transmitting coil; and
a power transmitting resonant frequency control unit configured to conform a phase difference between the detected phase of the voltage and the detected phase of the current to a target value by varying a resonant frequency of a resonant circuit including the power transmitting coil or a resonant circuit including the power receiving coil.

8. The power transmission device according to claim 7, wherein:
the power transmitting coil includes a power supplying coil to which an alternating-current power supply is connected, and a power transmitting resonant coil closely coupled electromagnetically with the power supplying coil; and
the power transmitting resonant frequency control unit includes:

a target value setting unit configured to set and store the target value; and
a feedback control unit configured to vary a resonant frequency of the power transmitting resonant coil such that a phase difference between a voltage of the alternating-current power supply and a current of the power transmitting resonant coil becomes the set target value.

9. The power transmission device according to claim 8, wherein:
the feedback control unit includes:
a phase comparison unit configured to compare the phase of the voltage and the phase of the current, and to output a phase difference being a difference between them;
a calculation unit configured to calculate a phase difference that the phase comparison unit outputs and a target value set by the target value setting unit; and
a driver configured to drive to as to vary an inductance or a capacitance in the power transmitting resonant coil.

10. The power transmission device according to claim 8, wherein:
the target value setting unit sets −n as the target value.

11. The power transmission device according to claim 7, further comprising
a phase transmission unit configured to transmit information representing a phase of a voltage supplied to the power transmitting coil wirelessly.

12. A power receiving device in a magnetic field resonant coupling type power transmission system transmitting an electric power from a power transmitting coil to a power receiving coil using magnetic field resonance, the power receiving device comprising:
a phase reception unit configured to receive information representing a phase of a voltage supplied to the power transmitting coil;
a power receiving phase detection unit configured to detect a phase of a current that flows in the power receiving coil; and
a power receiving resonant frequency control unit configured to conform a phase difference between the phase of the voltage represented by the received information and the detected phase of the current to a target value by varying a resonant frequency of a resonant circuit including the power transmitting coil or a resonant circuit including the power receiving coil.

13. The power receiving device according to claim 12, wherein:
the power receiving coil includes a power receiving resonant coil, and a power drawing coil closely coupled electromagnetically with the power receiving resonant coil; and
the power receiving resonant frequency control unit includes:
a target value setting unit configured to set and store the target value; and
a feedback control unit configured to vary a resonant frequency of the power receiving resonant coil such that a phase difference between the phase of the voltage represented by the received information and the detected phase of the current becomes the target value.

14. The power receiving device according to claim 13, wherein
the feedback control unit includes:

a phase comparison unit configured to compare the phase of the voltage and the phase of the current, and to output a phase difference being the difference between them;

a calculation unit configured to calculate a phase difference that the phase comparison unit outputs and a target value set by the target value setting unit; and a driver configured to drive to as to vary an inductance or a capacitance in the power receiving resonant coil.

15. The power receiving device according to claim 13, wherein the target value setting unit sets $-3n/2$ as the target value.

16. The power receiving device according to claim 13, wherein:

the target value setting unit switches and sets the target value to $-2n$ when a degree of coupling between the power transmitting coil and the power receiving coil increases and a diphasic property appears.

* * * * *